United States Patent Office 2,870,141
Patented Jan. 20, 1959

2,870,141
6-FLUORO-20-HYDROXY-4-PREGNEN-3-ONES AND THE 20-ACYLATES THEREOF

J. Allan Campbell, Kalamazoo, John C. Babcock, Portage Township, Kalamazoo County, and John A. Hogg, Kalamazoo, Mich., assignors to The Upjohn Company, Kalamazoo, Mich., a corporation of Michigan No Drawing. Application June 9, 1958
Serial No. 740,554

19 Claims. (Cl. 260—239.5)

This invention relates to novel 6α- and 6β-fluorinated compounds of the pregnane series and is more particularly concerned with 6α-fluoro-20β-hydroxy-4-pregnen-3-one, 6α-fluoro-20α-hydroxy-4-pregnen-3-one, 6β-fluoro-20β-hydroxy-4-pregnen-3-one, 6β-fluoro-20α-hydroxy-4-pregnen-3-one, the 20-acylates thereof and novel intermediates therefor, and methods used in the preparation thereof.

This application is a continuation-in-part of copending application Serial No. 699,504, filed November 29, 1957, now Patent No. 2,838,528, issued June 10, 1958.

The novel end products of the present invention are represented by the following formula:

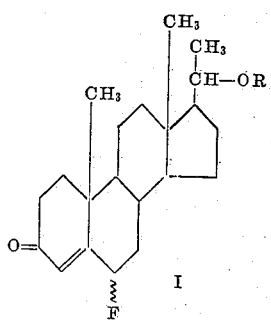

wherein R is selected from the group consisting of hydrogen or the acyl radical of an organic carboxylic acid containing from one to twelve carbon atoms, inclusive.

In this application the wavy line ($f$) appearing at the 6-position is a generic expression including the alpha (α) and beta (β) configuration.

The novel compounds and processes are represented by the following reaction scheme:

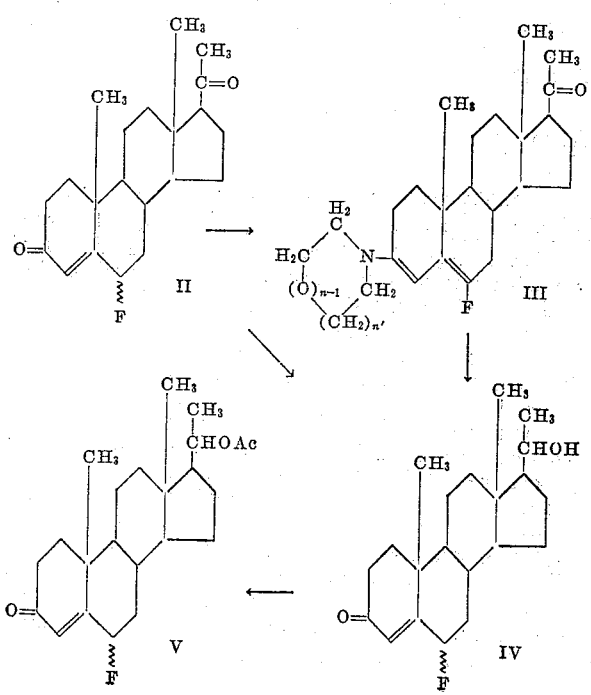

wherein $n$ and $n'$ are whole numbers from one to two, inclusive, and Ac is the acyl radical of an organic carboxylic acid, preferably a hydrocarbon carboxylic acid containing from one to twelve carbon atoms, inclusive.

The novel 6-fluoro-20-hydroxy-4-pregnen-3-ones of this invention possess progestational and central nervous system depressing activity. An advantage of these compounds is that the presence of the 20-hydroxy group makes possible the preparation of numerous esters which can be chosen to be oil soluble, e. g., the acetate or propionate, water soluble, for example the 20-hemisuccinate, or especially long acting, for example the 20-cyclopentyl-propionate, all having progesterone-like or progestational activity.

The 6-fluoro-20-hydroxy-4-pregnen-3-ones and the 20-acylates thereof, represented by Formula I, affect the secretion of gonadotropins and thus regulate ovulation and endometrial and placental development and, particularly when used in conjunction with estrogens, e. g. ethinylestradiol and/or androgens, e. g., 9α-fluoro-11β-hydroxy-17-methyltestosterone reduce fertility, and are useful in the treatment of dysmenorrhea, amenorrhea, endometriosis, threatened abortion and related gynecological disorders.

The novel compounds of Formula I of this invention can be prepared and administered to the animal organism in a wide variety of oral and subcutaneous dosage forms singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The starting materials for the present invention, 6α-fluoroprogesterone and 6β-fluoroprogesterone, can be prepared in accordance with the procedures disclosed in our copending application Serial No. 699,504, filed November 29, 1957.

One of the processes of the present invention comprises treating a 6-fluoroprogesterone represented by Formula II with a secondary amine, such as pyrrolidine, to obtain the compounds of Formula III, such as 6-fluoro-3-(N-pyrrolidinyl)-3,5-pregnadien-20-one. The enamine formation can be carried out in accordance with the disclosure of U. S. Patent No. 2,781,342. Other secondary amines and particularly secondary cyclic amines, such as morpholine, piperidine, homomorpholine, C-alkyl substituted pyrrolidines e. g., 2,4-dimethylpyrrolidine, 3-isopropylpyrrolidine, 3,3-dimethylpyrrolidine, and the like are suitable to convert the compounds of Formula II into the corresponding 3-enamine compounds of Formula III. Reaction solvents which can be employed are methanol, ethanol, tertiary butyl alcohol, tetrahydrofuran, dioxane, benzene, toluene, xylene, chlorobenzene, pentane, hexane, methylene chloride, diethyl ether, an excess of amine, and the like. It is sometimes desirable to add an acid catalyst as an aid to the reaction and to enhance the yield of product. For this purpose para-toluenesulfonic acid, naphthalenesulfonic acid, sulfuric acid, and the like may be used.

The thus-obtained compounds of Formula III are then treated with lithium aluminum hydride (LiAlH$_4$) to reduce the side chain at the 20-position. The lithium aluminum hydride reduction is usually carried out by adding a solution of the selected 3-enamine of 6-fluoroprogesterone in an organic solvent which is non-reactive under the conditions of the reaction to a lithium aluminum hydride solution or suspension in ether. Other solvents which may be used include tetrahydrofuran, dioxane, or the like, as well as other solvents commonly used in lithium aluminum hydride reductions. When ether is used, the reaction is usually carried out at a temperature between about room temperature and the boiling point of the solvent, although temperatures substantially below room temperature may be successfully employed.

Lithium aluminum hydride is usually employed in a substantial chemical equivalent excess to ensure optimum yields of desired product. When the steroid and lithium aluminum hydride have been thoroughly mixed and the heat of reaction has subsided, the reaction is essentially complete. Continued stirring or heating or both are usually employed, however, to ensure completeness of reaction. The resulting steroid—LiAlH$_4$ complex and the excess lithium aluminum hydride are decomposed by the careful addition of water or ammonium chloride-water solution to the reaction mixture. If desired a solvent such as ethyl acetate may be added to decompose the excess lithium aluminum hydride before the water or water solution is added.

Following the lithium aluminum hydride decomposition, the 3-enamine group is removed by hydrolysis. The hydrolysis of the 3-enamine group is preferably carried out using a buffered solution, such as a solution containing sodium acetate, water, glacial acetic and methanol. Alternatively, the 3-enamine group is hydrolyzed using mildly alkaline conditions, such as a sodium acetate solution. The 6-fluoro-20-hydroxy-4-pregnen-3-ones of Formula IV, such as 6α-fluoro-20β-hydroxy-4-pregnen-3-one and 6α-fluoro-20α-hydroxy-4-pregnen-3-one, are then recovered from the solution used to hydrolyze the 3-enamine group according to procedures well-known in the art, such as by extraction with water-immiscible solvents, e. g., methylene chloride, ether, benzene or the like, followed by chromatography.

Alternatively, the compounds of the present invention can be prepared by allowing a solution of 6-fluoro-progesterone (II) in an organic solvent such as methanol, ethanol, isopropanol, dioxane, pyridine, and the like, to react with 0.8 to 1.5 equivalents of sodium or potassium borohydride at a temperature of between minus ten and plus ten degrees centigrade, although somewhat lesser or greater amounts of the borohydride and somewhat higher or lower temperatures are operative. When 6α-fluoro-progesterone is selected as the starting material, the process is productive of a mixture of 6α-fluoro-20β-hydroxy-4-pregnen-3-one and 6α-fluoro-20α-hydroxy-4-pregnen-3-one which can be separated and purified by conventional methods, such as chromatography and recrystallization. Similarly, 6β-fluoroprogesterone yields 6β-fluoro-20β-hydroxy-4-pregnen-3-one and 6β-fluoro-20α-hydroxy-4-pregnen-3-one.

The 6-fluoro-20-hydroxy-4-pregnen-3-ones, represented by Formula IV, can be converted to the 20-acylates thereof, represented by Formula V, using conventional 21-acylating conditions.

Suitable acylating agents are organic carboxylic acids, particularly hydrocarbon carboxylic acids containing from one to twelve carbon atoms, inclusive, or the acid anhydrides or acid halides thereof. For example, an aliphatic acid, formic, acetic, propionic, butyric, valeric, hexanoic, lauric, trimethylacetic, isobutyric, isovaleric, tertiary butylacetic, a cycloaliphatic acid, e. g., β-cyclopentyl-propionic, cyclohexane-carboxylic, cyclohexylacetic, an alkaryl acid, e. g., benzoic, phenylacetic, β-phenylpro-pionic, o-, m-, p-toluic, a saturated dibasic acid (which can be converted into water soluble, e. g., sodium, salts), e. g., succinic, adipic, a monobasic unsaturated acid, e. g., acrylic, crotonic, undecylenic, propiolic, 2-butynoic, un-decolic, cinnamic, dibasic unsaturated acids (which can be converted into water soluble, e. g., sodium, salts), e. g., maleic and citraconic, or the acid anhydrides and acid halides thereof, can be used to esterify the 6-fluoro-20-hy-droxy-4-pregnen-3-ones to convert them into their corresponding 20-acylates. If the acylating agent is the free acid, the reaction is preferably effected in the presence of an esterification catalyst, for example, p-toluene-sulfonyl chloride, trifluoroacetic anhydride, p-toluene-sulfonic acid, trifluoroacetic acid, sulfuric acid, and the like.

The foregoing compounds of Formulae II, IV and V are all characterized by the presence of a 6-fluoro substituent. It should be noted that the configuration of the fluorine at the 6-position can be either 6α or 6β. When 6β-fluoroprogesterone is used as the starting steroid and sodium or potassium borohydride is used to effect reduction at the 20-position, as described above and exemplified in greater detail below, the final products are the corresponding 6β-epimers.

The 6α-epimers can be obtained by treatment of the 6β-epimers at temperatures of zero degrees centigrade, or slightly higher or lower temperatures, in an organic solvent, such as chloroform, methylene chloride, ether, and the like, and in the presence of a prototropic agent (proton-donating reagent) such as alcohols, organic acids, and the like with a mineral acid such as hydrogen chloride. The mixture should preferably be maintained at a temperature of zero degrees centigrade, although slightly higher or lower temperatures can be used, during the addition of the acid. The reaction mixture can then be washed with successive portions of dilute alkali and water, and then dried and evaporated under reduced pressure. The 6α-fluoro products can be recovered from the crude reaction product and purified by recrystallization.

Alternatively, the epimerization can be accomplished with alkali. Bases, for example, solutions of sodium hydroxide and potassium hydroxide, may be used to treat the 6β-epimer in solution in an organic solvent, such as methanol, to produce the 6α-epimer.

The following examples are illustrative of the process and products of the present invention, but are not to be construed as limiting.

EXAMPLE 1

6-fluoro-3-(N-pyrrolidinyl)-3,5-pregnadien-20-one (III)

To one gram of 6α-fluoroprogesterone (II) in five milliliters of boiling methanol (nitrogen bubbling through) was added 0.6 milliliter of pyrrolidine. After boiling for a period of about one-half minute crystals started to form. The reaction mixture was cooled and the crystals collected by filtration washed with cold methanol and dried to give 1.1 grams of 6-fluoro-3-(N-pyrrolidinyl)-3,5-pregnadien-3-one having a melting point of 152 to 156 degrees centigrade with decomposition, $[\alpha]_D$ minus 44 degrees in pyridine, and an ultraviolet absorption $$\lambda_{max.}^{alc.} \ 275 \ m\mu$$

$a_M$ 19,400.

EXAMPLE 2

6α-fluoro-20β-hydroxy-4-pregnen-3-one (IV)

To a solution of one gram of 6-fluoro-3-(N-pyrrolidinyl)-3,5-pregnadien-20-one (III) in fifty milliliters of dry ether was added 0.2 gram of lithium aluminum hydride. The reaction mixture was stirred at room temperature (about 25 degrees centigrade) for a period of one-half hour. A few drops of ethyl acetate was added, and then water was added dropwise until the inorganic material coagulated. The ether was decanted, dried over magnesium sulfate, filtered and concentrated to dryness. The enamine residue was dissolved in twenty milliliters of hot methanol and to this was added one gram of sodium acetate and one milliliter of acetic acid in 3.5 milliliters of water. The solution was boiled for a period of fifteen minutes and then allowed to stand overnight at room temperature (about 25 degrees centigrade). Most of the solvent was then evaporated under a stream of nitrogen. Water was added to the residue giving a precipitate which was collected by filtration and washed with methanol-water. The precipitate was recrystallized from methanol-acetone and then from ethyl acetate to give 120 milligrams of 6α-fluoro-20β-hydroxy-4-pregnen-3-one having a melting point of 215 to 219 degrees centigrade, $[\alpha]_D$ plus 59 degrees in chloroform, and an ultraviolet absorption $$\lambda_{max.}^{alc.} 238 \, m\mu$$

$a_M$ 14,400.

Analysis.—Calculated for $C_{21}H_{30}FO_2$: C, 75.41; H, 9.34; F, 5.68. Found: C, 75.05; H, 9.28; F, 5.0.

6α-fluoro-20α-hydroxy-4-pregnen-3-one is obtained from the crystallization mother liquors by chromatography followed by crystallization.

EXAMPLE 3

6α-fluoro-20β-hydroxy-4-pregnen-3-one and 6α-fluoro-20α-hydroxy-4-pregnen-3-one (IV)

A solution of one gram of 6α-fluoroprogesterone (II) in fifty milliliters of methanol is chilled to about five degrees centigrade and diluted with a solution of 57 milligrams of potassium borohydride in one milliliter of water (containing one drop of five percent sodium hydroxide solution) with rapid stirring. Stirring is continued for about fifteen to thirty minutes after which the mixture is quenched with fifty milliliters of water containing 0.5 milliliter of acetic acid. The solution is then concentrated under reduced pressure to give a mixture of 6α-fluoro-20β-hydroxy-4-pregnen-3-one and 6α-fluoro-20α-hydroxy-4-pregnen-3-one. The crude product is then dissolved in methylene chloride and chromatographed over 100 grams of Florisil (synthetic magnesium silicate). The chromatogram column is eluted with Skellysolve B hexanes containing increasing proportions of acetone to give 6α-fluoro-20β-hydroxy-4-pregnen-3-one (four percent acetone) and 6α-fluoro-20α-hydroxy-4-pregnen-3-one (eight percent acetone) which can be further purified by crystallization from acetone-hexane mixture.

In the same manner the substitution of 6β-fluoroprogesterone for 6α-fluoroprogesterone produces 6β-fluoro-20β-hydroxy-4-pregnen-3-one and 6β-fluoro-20α-hydroxy-4-pregnen-3-one.

EXAMPLE 4

6α-fluoro-20β-hydroxy-4-pregnen-3-one 20-acetate (V)

A solution is prepared containing fifty milligrams of 6α-fluoro-20β-hydroxy-4-pregnen-3-one (IV) in one milliliter of pyridine and one milliliter of acetic anhydride. The solution is allowed to stand at room temperature for a period of about 21 hours and is thereupon poured into ice water to give crystals of 6α-fluoro-20β-hydroxy-4-pregnen-3-one 20-acetate which can be purified by recrystallization from acetone-Skellysolve B hexanes.

Similarly, substitution of 6α-fluoro-20α-hydroxy-4-pregnen-3-one, 6β-fluoro-20β-hydroxy-4-pregnen-3-one, or 6β-fluoro-20α-hydroxy-4-pregnen-3-one, for 6α-fluoro-20β-hydroxy-4-pregnen-3-one, produces 6α-fluoro-20α-hydroxy-4-pregnen-3-one 20-acetate, 6β-fluoro-20β-hydroxy-4-pregnen-3-one 20-acetate, and 6β-fluoro-20α-hydroxy-4-pregnen-3-one 20-acetate, respectively.

EXAMPLE 5

6α-fluoro-20β-hydroxy-4-pregnen-3-one 20-hemisuccinate (V)

A solution is prepared containing 0.5 gram of succinic anhydride and 0.1 gram of 6α-fluoro-20β-hydroxy-4-pregnen-3-one (IV) in five milliliters of pyridine. This solution is allowed to stand overnight for a period of about twenty hours, is thereupon diluted with water and the mixture refrigerated and filtered. The precipicate thus collected on filter paper is recrystallized two times from methanol to give 6α-fluoro-20-hydroxy-4-pregnen-3-one 20-hemisuccinate (V).

Similarly, substitution of the 6-fluoro compounds, represented by Formula IV, namely, 6α-fluoro-20α-hydroxy-4-pregnen-3-one, 6β-fluoro-20β-hydroxy-4-pregnen-3-one, and 6β-fluoro-20α-hydroxy-4-pregnen-3-one, for 6α-fluoro-20β-hydroxy-4-pregnen-3-one, produces 6α-fluoro-20α-hydroxy-4-pregnen-3-one 20-hemisuccinate, 6β-fluoro-20β-hydroxy-4-pregnen-3-one 20-hemisuccinate, and 6β-fluoro-20α-hydroxy-4-pregnen-3-one 20-hemisuccinate, respectively.

In the same manner as in Example 5, other esters of 6α-fluoro-20β-hydroxy-4-pregnen-3-one, 6α-fluoro-20α-hydroxy-4-pregnen-3-one, 6β-fluoro-20β-hydroxy-4-pregnen-3-one, and 6β-fluoro-20α-hydroxy-4-pregnen-3-one, reprenested by Formula V, are prepared by allowing the compounds of Formula IV to react with the appropriate hydrocarbon carboxylic acids or the acid anhydrides and acid halides thereof. Illustrative of the 20-esters thus produced, are 6α-fluoro-20β-hydroxy-4-pregnen-3-one 20-formate, 6α-fluoro-20β-hydroxy-4-pregnen-3-one 20-propionate, 6α-fluoro-20β-hydroxy-4-pregnen-3-one 20-butyrate, 6α-fluoro-20β-hydroxy-4-pregnen-3-one 20-valerate, 6α-fluoro-20β-hydroxy-4-pregnen-3-one 20-hexanoate, 6α-fluoro-20β-hydroxy-4-pregnen-3-one 20-laurate, 6α-fluoro-20β-hydroxy-4-pregnen-3-one 20-trimethylacetate, 6α-fluoro-20β-hydroxy-4-pregnen-3-one 20-isobutyrate, 6α-fluoro-20β-hydroxy-4-pregnen-3-one 20-isovalerate, 6α-fluoro-20β-hydroxy-4-pregnen-3-one 20-tertiary butylacetate, 6α-fluoro-20β-hydroxy-4-pregnen-3-one 20-(β-cyclopentylpropionate), 6α-fluoro-20β-hydroxy-4-pregnen-3-one 20-cyclohexanecarboxylate, 6α-fluoro-20β-hydroxy-4-pregnen-3-one 20-cyclohexylacetate, 6α-fluoro-20β-hydroxy-4-pregnen-3-one 20-benzoate, 6α-fluoro-20β-hydroxy-4-pregnen-3-one 20-phenylacetate, 6α-fluoro-20β-hydroxy-4-pregnen-3-one 20-(β-phenylpropionate), 6α-fluoro-20β-hydroxy-4-pregnen-3-one 20-(o, m, and p-toluate), 6α-fluoro-20β-hydroxy-4-pregnen-3-one 20-hemiadipate, 6α-fluoro-20β-hydroxy-4-pregnen-3-one 20-acrylate, 6α-fluoro-20β-hydroxy-4-pregnen-3-one 20-crotonate, 6α-fluoro-20β-hydroxy-4-pregnen-3-one 20-undecylenate, 6α-fluoro-20β-hydroxy-4-pregnen-3-one, 20-propiolate, 6α-fluoro-20β-hydroxy-4-pregnen-3-one 20-(2-butynoate), 6α-fluoro-20β-hydroxy-4-pregnen-3-one 20-undecolate, 6α-fluoro-20β-hydroxy-4-pregnen-3-one 20-cinnamate, 6α-fluoro-20β-hydroxy-4-pregnen-3-one 20-maleate, 6α-fluoro-20β-hydroxy-4-pregnen-3-one 20-citraconate, and the corresponding 20-acylates of 6α-fluoro-20α-hydroxy-4-pregnen-3-one, 6β-fluoro-20β-hydroxy-4-pregnen-3-one and 6β-fluoro-20α-hydroxy-4-pregnen-3-one.

If the corresponding acylating agent is solid, an inert solvent such as toluene, xylene, or dioxane can be added to effect solution and to provide a liquid esterification medium.

If the esterifying agent is the free acid, the reaction is carried out in the presence of an esterification catalyst.

EXAMPLE 5A

6α-fluoro-20β-hydroxy-4-pregnen-3-one 20-hemisuccinate sodium salt

Sodium hydroxide solution (0.1 Normal) is slowly added to a stirred solution of 100 milligrams of 6α-fluoro-20β-hydroxy-4-pregnen-3-one 20-hemisuccinate (V), dissolved in two milliliters of acetone until the pH rises to about 7.4. During the addition of sodium hydroxide solution, five milliliters of water is also added. The solution is then concentrated at 25 degrees centigrade under vacuum to remove the acetone. The resulting aqueous solution of 6α-fluoro-20β-hydroxy-4-pregnen-3-one 20-hemisuccinate sodium salt is filtered and freeze-dried to give pure 6α-fluoro-20β-hydroxy-4-pregnen-3-one 20-hemisuccinate sodium salt.

Similarly, substitution of 6α-fluoro-20α-hydroxy-4-pregnen-3-one 20-hemisuccinate, 6β-fluoro-20β-hydroxy-4-pregnene-3-one 20-hemisuccinate, or 6β-fluoro-20α-hydroxy-4-pregnen-3-one 20 hemisuccinate for 6α-fluoro-20β-hydroxy-4-pregnen-3-one 20-hemisuccinate produces 6α-fluoro-20α-hydroxy-4-pregnen-3-one 20-hemisuccinate sodium salt, 6β-fluoro-20β-hydroxy-4-pregnen-3-one 20-hemisuccinate sodium salt, and 6β-fluoro-20α-hydroxy-4-pregnen-3-one 20-hemisuccinate sodium salt, respectively.

EXAMPLE 6

*Isomerization of 6β-fluoro-20β-hydroxy-4-pregnen-3-one to 6α-fluoro-20-hydroxy-4-pregnen-3-one*

A solution of 0.150 gram of 6β-fluoro-20β-hydroxy-4-pregnen-3-one in twelve milliliters of chloroform and 0.1 milliliter of absolute alcohol is cooled to about minus ten degrees centigrade in an ice-salt bath and a stream of anhydrous hydrochloric acid is gently bubbled through the solution for approximately 2.5 hours while the temperature is maintained between minus five and minus fifteen degrees centigrade. The solution is then washed with dilute sodium bicarbonate and water, dried over anhydrous sodium sulfate, and evaporated to dryness under reduced pressure. Crystallization of the residue from acetone-Skellysolve B gives 6α-fluoro-20β-hydroxy-4-pregnen-3-one.

In a similar manner, 6β-fluoro-20α-hydroxy-4-pregnen-3-one, 6β-fluoro-20β-hydroxy-4-pregnen-3-one 20-acylate, and 6β-fluoro-20α-hydroxy-4-pregnen-3-one 20-acylate are converted to their corresponding 6α-fluoro compounds.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6-fluoro compound of the formula:

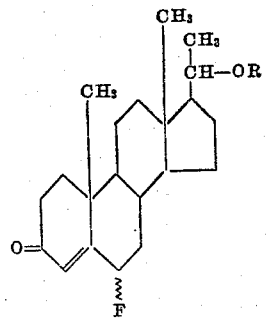

wherein R is selected from the group consisting of hydrogen and the acyl radical of a hydrocarbon carboxylic acid containing from one to twelve carbon atoms, inclusive.

2. 6-fluoro-20β-hydroxy-4-pregnen-3-one.
3. 6α-fluoro-20β-hydroxy-4-pregnen-3-one.
4. 6β-fluoro-20β-hydroxy-4-pregnen-3-one.
5. 6-fluoro-20α-hydroxy-4-pregnen-3-one.
6. 6α-fluoro-20α-hydroxy-4-pregnen-3-one.
7. 6β-fluoro-20α-hydroxy-4-pregnen-3-one.
8. 6-fluoro-20β-hydroxy-4-pregnen-3-one 20-acylates in which the acyl radical is that of a hydrocarbon carboxylic acid containing from one to twelve carbon atoms, inclusive.
9. 6α-fluoro-20β-hydroxy-4-pregnen-3-one 20-acetate.
10. 6α-fluoro-20β-hydroxy-4-pregnen-3-one 20-hemisuccinate.
11. 6β-fluoro-20β-hydroxy-4-pregnen-3-one 20-acetate.
12. 6β-fluoro-20β-hydroxy-4-pregnen-3-one - 20 - hemisuccinate.
13. 6-fluoro-20α-hydroxy-4-pregnen-3-one 20-acylates in which the acyl radical is that of a hydrocarbon carboxylic acid containing from one to twelve carbon atoms, inclusive.
14. 6α-fluoro-20α-hydroxy-4-pregnen-3-one 20-acetate.
15. 6α-fluoro-20α-hydroxy-4-pregnen-3-one 20-hemisuccinate.
16. 6β-fluoro-20α-hydroxy-4-pregnen-3-one 20-acetate.
17. 6β-fluoro-20α-hydroxy-4-pregnen-3-one 20-hemisuccinate.
18. A 6-fluoro compound of the formula:

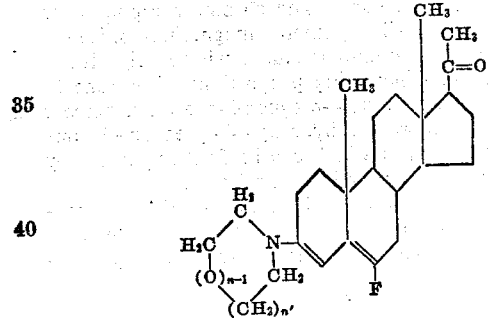

wherein $n$ and $n'$ are whole numbers from one to two, inclusive.

19. 6-fluoro-3-(N-pyrrolidinyl)-3,5-pregnadien-20-one.

No references cited.